United States Patent
Ramanathan et al.

(10) Patent No.: US 11,681,995 B1
(45) Date of Patent: *Jun. 20, 2023

(54) POINT OF SALE (POS) DEVICE FOR CURRENCY CONTROL

(71) Applicant: Wells Fargo Bank, N.A., San Francisco, CA (US)

(72) Inventors: Ramanathan Ramanathan, Bellevue, WA (US); Chris Theodore Kalaboukis, San Jose, CA (US); Andrew J. Garner, IV, State Road, NC (US); Abhijit Rao, Irvine, CA (US); Joon Maeng, Newcastle, WA (US); Andres J. Saenz, Redmond, WA (US); Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,613

(22) Filed: Nov. 6, 2020

(51) Int. Cl.
*G06Q 20/20* (2012.01)
*G07G 1/12* (2006.01)
*G07G 1/00* (2006.01)

(52) U.S. Cl.
CPC ......... *G06Q 20/204* (2013.01); *G07G 1/0027* (2013.01); *G07G 1/0081* (2013.01); *G07G 1/12* (2013.01)

(58) Field of Classification Search
CPC ...... G06Q 20/204; G07G 1/12; G07G 1/0081; G07G 1/0027
See application file for complete search history.

(56) References Cited

U.S. PATENT DOCUMENTS

| 5,220,157 A | 6/1993 | Martin et al. |
| 7,076,458 B2 | 7/2006 | Lawlor et al. |

(Continued)

FOREIGN PATENT DOCUMENTS

| EP | 1316035 A1 | 6/2003 |
| WO | 2017/074281 A1 | 5/2017 |

OTHER PUBLICATIONS

"Authorized Banknote Disposal". Retrieved from <https://www.halfbakery.com/idea/Authorized_20Banknote_20Disposal> on Jul. 22, 2021. Last updated 2015. (Year: 2015).*

(Continued)

*Primary Examiner* — Nathan A Mitchell
(74) *Attorney, Agent, or Firm* — Shumaker & Sieffert, P.A.

(57) ABSTRACT

Methods, apparatuses, and computer program products are disclosed for currency control. An example point-of-sale (POS) device for use with physical currency notes includes a scanning system configured to generate physical currency data associated with one or more physical currency notes and a controller operably coupled with the scanning system. The controller is configured to generate digital currency data based upon the physical currency data. The digital currency data includes a digital representation of the physical currency notes. The controller further determines one or more selected physical currency notes for destruction based upon the digital currency data and may query a currency attribute database that includes one or more currency attributes associated with the physical currency notes. The POS device also includes a currency destruction mechanism that causes destruction of the selected physical currency notes.

12 Claims, 8 Drawing Sheets

(56) References Cited

U.S. PATENT DOCUMENTS

| | | | |
|---|---|---|---|
| 7,959,072 B1* | 6/2011 | Jenkins | G07F 19/20 235/379 |
| 9,015,065 B2 | 4/2015 | Gui et al. | |
| 11,055,707 B2 | 7/2021 | Lingappa | |
| 2003/0106770 A1* | 6/2003 | Lundblad | G07D 11/40 194/209 |
| 2004/0222283 A1* | 11/2004 | Mastie | G06Q 20/1085 235/379 |
| 2005/0033651 A1* | 2/2005 | Kogan | G06Q 30/0601 705/26.1 |
| 2005/0080731 A1 | 4/2005 | Dnyaneshwar | |
| 2007/0172106 A1* | 7/2007 | Paraskevakos | G06K 9/6857 382/135 |
| 2007/0282726 A1 | 12/2007 | Koester et al. | |
| 2008/0219543 A1* | 9/2008 | Csulits | G06K 9/033 382/135 |
| 2010/0032477 A1* | 2/2010 | Faulkner | G06Q 40/02 235/379 |
| 2011/0208659 A1 | 8/2011 | Easterly et al. | |
| 2012/0197433 A1* | 8/2012 | Buchmann | G07D 11/25 700/224 |
| 2013/0054469 A1 | 2/2013 | Agashe et al. | |
| 2013/0317960 A1* | 11/2013 | Holl | G06Q 40/00 705/35 |
| 2016/0267481 A1 | 9/2016 | Gramenov | |
| 2017/0323509 A1* | 11/2017 | Takada | G07F 19/202 |
| 2018/0108222 A1* | 4/2018 | Lopez | G07D 11/225 |
| 2020/0151682 A1* | 5/2020 | Hurry | H04L 63/12 |
| 2020/0160331 A1* | 5/2020 | Kurien | G07D 11/30 |
| 2021/0073544 A1* | 3/2021 | Herzberg | G06Q 30/0251 |

OTHER PUBLICATIONS

Mas, Ignacio et al., "Banking through Networks of Retail Agents", CGAP, Focus Notes, No. 47, dated May 2008.

U.S. Appl. No. 17/091,593, filed Nov. 6, 2020, by Ramanathan et al.

* cited by examiner

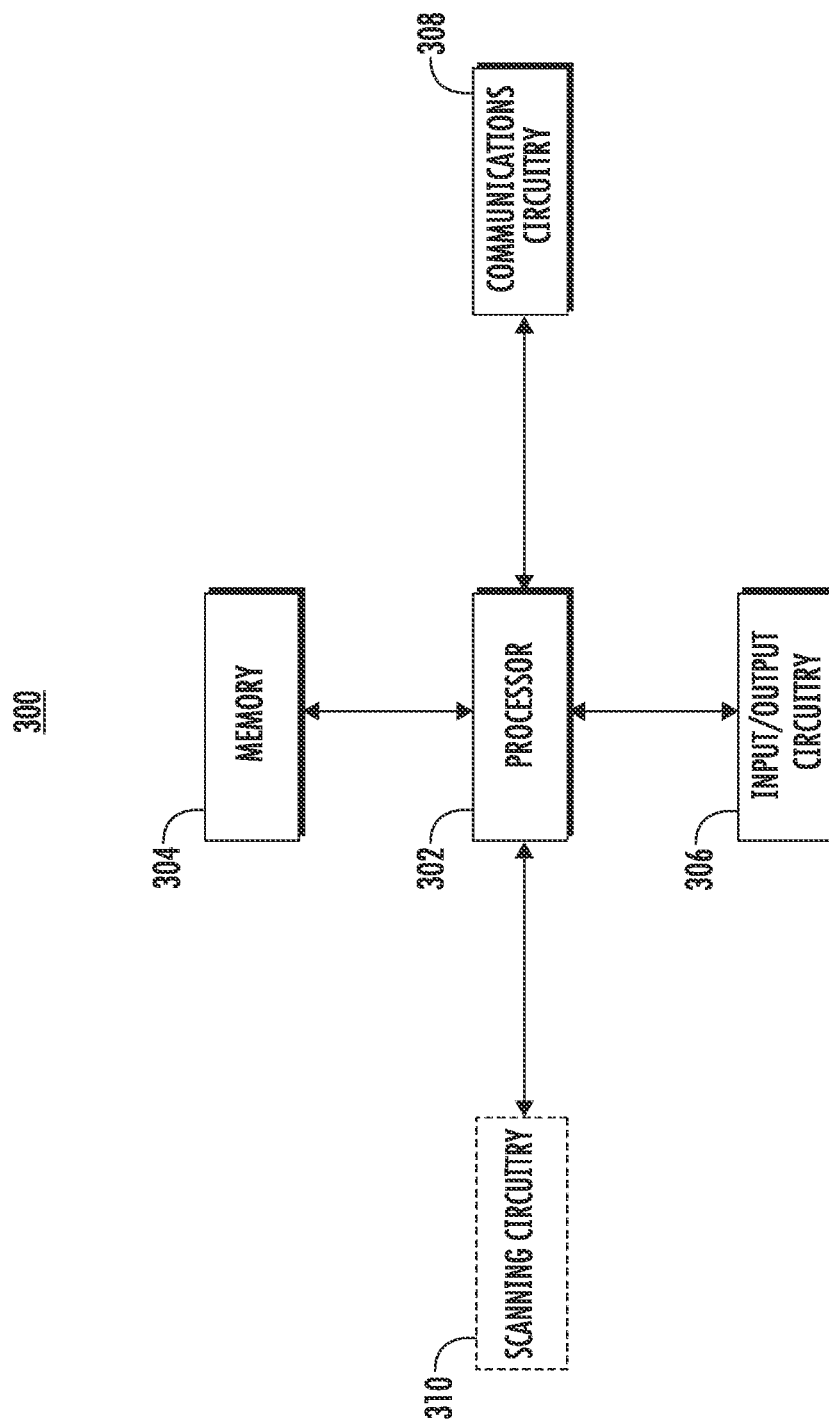

POINT OF SALE (POS) DEVICE FOR CURRENCY CONTROL

TECHNOLOGICAL FIELD

Example embodiments of the present disclosure relate generally to transaction systems and point of sale (POS) devices and, more particularly, to the digitization of physical currency notes and associated currency control.

BACKGROUND

Physical currency notes, bills, banknotes, and other legal tender are widely used by consumers as payment in exchange for goods and services. Due to this widespread use, information regarding the amount and/or types of physical currency in circulation may not be readily available or easily ascertained. Consumers may also rely upon digital forms of payment (e.g., credit cards, debit cards, or the like) in combination with physical currency further complicating circulation determinations.

BRIEF SUMMARY

As described above, various forms of physical currency (e.g., notes, bills, banknotes, etc.) are often used by consumers in the normal course of purchasing goods and services. For example, a customer may interact with a merchant by purchasing an item for sale from the merchant, and the transaction may occur at the POS device (e.g., cash register) of the merchant. Such POS devices are traditionally used to store physical currency notes for use by the merchant in other transactions or to be later supplied to a financial institution (e.g., a deposit in a bank associated with the merchant's account). Due to the widespread use of physical currency, determinations regarding the amount, denominations, etc. of physical currency in circulation are difficult to ascertain. In some instances, regulatory agencies or other central authorities (e.g., the Federal Reserve or the like) may desire to reduce the amount of physical currency in circulation, reduce the amount of a particular denomination in circulation, and/or the like in response to inflation concerns, counterfeiting measures, etc. In other instances, these entities may be concerned with the spread of infectious diseases, especially by physical currency that has traveled through locations with high incidences of such diseases. For example, regulatory agencies (e.g., the Center for Disease Control or the like) may desire to remove from circulation and subsequently destroy physical currency notes that have been located in areas with an increased number of positive cases of one or more diseases, for example COVID-19 (2019 Novel Coronavirus).

Traditional POS devices and related systems, however, require that physical currency be supplied to a centralized location (e.g., a financial institution) to be subsequently removed from circulation and/or destroyed. This movement of physical currency, such as between a central authority (e.g., the Federal Reserve) and a financial institution, is often associated with burdensome transportation costs. Said differently, conventional POS devices are designed to not only store physical currency, for example currency that has been in contact with an infectious disease, but further reintroduce such currency into circulation. Furthermore, although automated teller machines (ATMs) are sometimes available for consumers to transact with a financial institution, many consumers (e.g., the underbanked and/or unbanked) have little to no access to these alternative mechanisms for transacting with a financial institution. As such, current currency systems and POS devices fail to not only adequately ascertain and control physical currency notes, but further fail to provide banking functionality to those who are otherwise unable to interact with a financial institution.

To solve these issues and others, example implementations of embodiments of the present disclosure may, via a currency control server and/or POS device, generate digital currency data based upon physical currency notes received by a POS device and determine selected physical currency notes for destruction based upon the digital currency data. These systems and devices may query currency attribute databases to retrieve data indicative of the attributes of the physical currency notes and may further query user parameter databases that store various parameters associated with a user supplying the physical currency notes. In doing so, the system may, in real-time and at a point-of sale/transaction, ascertain physical currency for destruction (e.g., physical currency that is truncated and subsequently destroyed). In this way, the inventors have identified that the advent of new scanning technologies have created a new opportunity for solutions for providing currency digitization and control which were historically unavailable. In doing so, such example implementations confront and solve at least two technical challenges: (1) they generate digital payment data in real-time at a point of sale or transaction, and (2) they provide currency destruction functionality in a decentralized system.

Systems, apparatuses, methods, and computer program products are disclosed herein for providing currency control. With reference to an example computer-implemented method, a method for providing currency control may include receiving physical currency data associated with one or more physical currency notes and generating digital currency data based upon the physical currency data. The digital currency data may include a digital representation of the physical currency notes. The method may further include determining one or more selected physical currency notes for destruction based upon the digital currency data and causing destruction of the selected physical currency notes.

In some embodiments, generating digital currency data further includes determining currency attribute data associated with the physical currency notes, and authenticating the physical currency notes based upon the currency attribute data. In response to authenticating the physical currency notes, the method may further include identifying a user associated with the physical currency data, and effectuating a deposit in a user account of the user based upon the digital currency data.

In some embodiments, determining one or more selected physical currency notes for destruction further includes querying a currency attribute database that includes one or more currency attributes associated with the physical currency notes, and determining one or more selected physical currency notes for destruction based upon the currency attributes.

In some further embodiments, the method may include modifying the currency attribute database in response to causing destruction of the selected physical currency notes.

In some embodiments, determining one or more selected physical currency notes for destruction may further include identifying a user associated with the physical currency data, and querying a user parameter database that includes one or more user parameters associated with the user. In such an embodiment, the method may further include determining one or more selected physical currency notes for destruction based upon the user parameters.

In some embodiments, determining one or more selected physical currency notes for destruction further includes determining one or more physical currency notes to maintain in circulation and causing separation of the physical currency notes to maintain in circulation from the one or more selected physical currency notes for destruction.

Point-of-sale (POS) devices and associated methods are also disclosed herein for providing currency control associated with physical currency notes. With reference to an example POS device for use with physical currency notes, the POS device may include a scanning system configured to generate physical currency data associated with one or more physical currency notes. The POS device may further include a controller operably coupled with the scanning system. The controller may be configured to generate digital currency data based upon the physical currency data where the digital currency data includes a digital representation of the physical currency notes. The controller may further be configured to determine one or more selected physical currency notes for destruction based upon the digital currency data. The POS device may also include a currency destruction mechanism configured to cause destruction of the selected physical currency notes.

In some embodiments, the controller is further configured to determine currency attribute data associated with the physical currency notes and authenticate the physical currency notes based upon the currency attribute data. In such an embodiment, the controller may be further configured to, in response to authenticating the physical currency notes, identify a user associated with the physical currency data and effectuate a deposit in a user account of the user based upon the digital currency data.

In some embodiments, the controller may be further configured to query a currency attribute database that includes one or more currency attributes associated with the physical currency notes and determine one or more selected physical currency notes for destruction based upon the currency attributes. In such an embodiment, the controller may be further configured to modify the currency attribute database in response to causing destruction of the selected physical currency notes.

In some embodiments, the controller may be further configured to identify a user associated with the physical currency data, query a user parameter database that includes one or more user parameters associated with the user, and determine one or more selected physical currency notes for destruction based upon the user parameters.

In some embodiments, the controller may be further configured to determine one or more physical currency notes to maintain in circulation and cause separation of the physical currency notes to maintain in circulation from the one or more selected physical currency notes for destruction.

In some embodiments, the POS device may include a housing supporting the scanning system and the controller. The housing may define a slotted input configured to receive the one or more physical currency notes. The slotted input may be associated with the scanning system such that the physical currency notes received by the slotted input are scanned upon input.

In some further embodiments, the housing may include a currency drawer that defines an enclosure for receiving physical currency. The currency drawer may define a first portion for storing one or more physical currency notes to maintain in circulation and a second portion for storing the one or more selected physical currency notes for destruction. In such an embodiment, the slotted input may be associated with the second portion of the currency drawer.

In some embodiments, the currency destruction mechanism may include a shredding device operably coupled with the housing. The shredding device may be coupled with a second portion of a currency drawer defined by the housing for storing the one or more selected physical currency notes for destruction.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 3B illustrates a block diagram of an example controller of the example POS device of FIG. 3A that may be specially configured in accordance with at least one example embodiment of the present disclosure.

DETAILED DESCRIPTION

Figure 1:
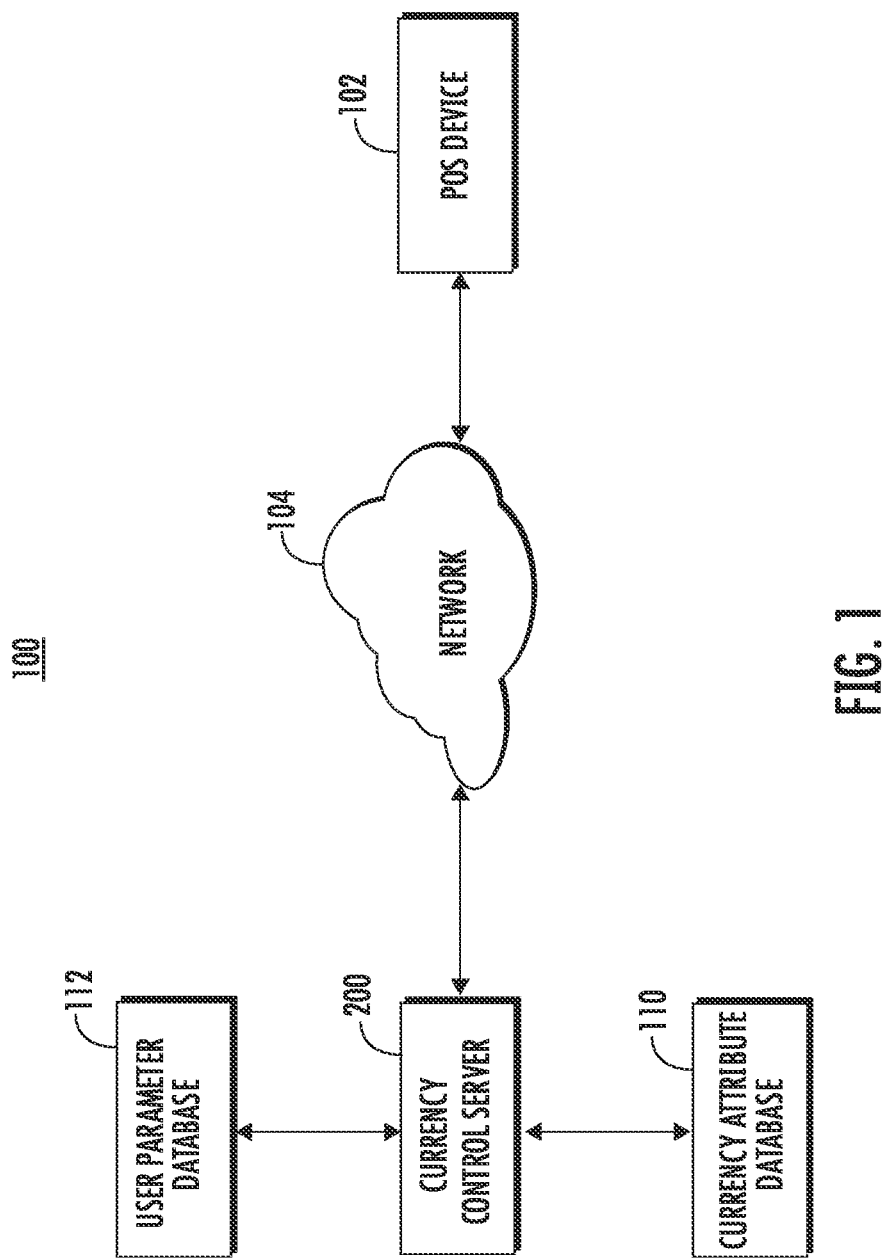
FIG. 1 illustrates a system diagram including devices that may be involved in some example embodiments described herein.

Some embodiments of the present disclosure will now be described more fully hereinafter with reference to the accompanying drawings, in which some, but not all embodiments are shown. Indeed, these embodiments may take many different forms and should not be construed as limited to the embodiments set forth herein; rather, these embodiments are provided so that this disclosure will satisfy applicable legal requirements. Like numbers refer to like elements throughout. As used herein, the description may refer to a currency control server or POS device as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "point-of-sale device," "POS device" and "cash register" may refer to a device or collection of devices configured to interact with users completing a transaction with physical currency notes. An example POS device may include a "smart device" that is equipped with a chip or other electronic device that is configured to communicate with the currency control server and/or other computing devices via Bluetooth, NFC, Wi-Fi, 3G, 4G, 5G, RFID protocols, and the like. An example POS device as described hereafter may include a scanning system configured to interact with physical currency notes, as part of a transaction or otherwise. In some instances, a POS device may include one or more accelerometers, gyroscopes, positional sensors, GPS sensors, cameras, image sensors, or the like configured to configured to generate physical currency data associated with physical currency notes. The POS device described herein may also generate digital currency data based upon the physical currency data that is a digital representation of the physical currency notes. Although described herein with reference to a POS device, the present disclosure contemplates that the operations described herein may also be applicable to cash vaults of a financial institution, a central authority (e.g., the Federal Reserve), or any other location at which physical currency notes may be manipulated and/or stored.

As used herein, the terms "physical currency," "physical currency notes," and "currency" may refer to any negotiable promissory note issued by a bank (e.g., central bank) or government as legal tender. In some instances, these terms may refer to paper money or banknotes but may similarly be used to refer to coin currency or any other physical instrument used to purchase goods or services. Similarly, "physical currency data" may refer to data generated, such as by a scanning system of a POS device, that is associated with one or more physical currency notes. By way of example, physical currency data may refer to scanning or image data generated in response to the receipt of physical currency notes (e.g., raw or otherwise unprocessed image data). Furthermore, "digital currency data," as used herein, may refer to data that is generated, by a controller or other computing device, based upon physical currency data and may include a digital representation of the physical currency notes. For example, "digital currency data" may refer to processed image data associated with physical currency notes that includes one or more currency attributes as defined hereafter.

As used herein, the term "currency attribute data" may refer to any data associated with physical currency notes. By way of example, currency attribute data may refer to data indicative of the denomination, serial number, watermark, security thread, status (e.g., created, distributed, destroyed, counterfeit, in circulation, etc.), or any other feature associated with a physical currency note. The term "currency attribute database" refers to a data structure or repository for storing currency attribute data. The currency attribute database may be accessible by one or more software applications of the currency control server 200 or POS device 102. In some embodiments, the currency attribute data may be stored as part of a distributed ledger so as to provide an immutable lineage of the state of physical currency notes. For example, such a distributed ledger may include nodes associated with verified currency scanning and destruction locations and may further include currency attribute data associated with physical currency notes. In doing so, access to the distributed ledger may be used to determine physical currency notes that are eligible for destruction or truncation, known counterfeit digital currency notes, and/or the like.

As used herein, the term "user parameter data" may refer to data associated with a particular user, user account, or user device. In some example embodiments, user parameter data may include one or more financial parameters, transaction histories, balances, spending patterns, social media data entries, travel histories, location data entries, preferences, or the like of a user. The term "user parameter database" refers to a data structure or repository for storing user data, user parameters, user profile data, user parameter data, and the like. The user parameter database may be accessible by one or more software applications of the currency control server 200 or POS device 102.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Example System

With reference to FIG. 1, an example system 100 is illustrated with an apparatus (e.g., a currency control server 200) communicably connected via a network 104 to a POS device 102. The example system 100 may also include a currency attribute database 110 and/or an user parameter database 112 that may be hosted by the currency control server 200 or otherwise hosted by devices in communication with the currency control server 200. The system 100 may further include POS device 102 that may, in some embodiments, be communicably coupled with the currency control server 200. In some instances, the POS device may include a plurality of interconnected POS devices or POS device components.

The currency control server 200 may include circuitry, networked processors, or the like configured to perform some or all of the apparatus-based (e.g., currency control server-based) processes described herein, and may be any suitable network server and/or other type of processing device. In this regard, currency control server 200 may be embodied by any of a variety of devices. For example, the currency control server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the currency control server 200 may be located remotely from the POS device 102, currency attribute database 110, or user parameter database 112, although in other embodiments, the currency control server 200 may comprise, in whole or in part, the POS device 102, the currency attribute database 110, and/or the user parameter database 112. The currency control server 200 may, in some embodiments, comprise several servers or computing devices performing interconnected and/or distributed functions. Despite the many arrangements contemplated herein, the currency control server 200 is shown and described herein as a single computing device to avoid unnecessarily overcomplicating the disclosure.

As described herein, the currency control server 200 may be associated with or otherwise controlled by a central authority, such as the Federal Reserve. In this way, one or more components (e.g., processor 202, communications circuitry 208, or the like) of the currency control server 200 and/or their respective operations may be controlled by such a central authority. By way of example, the currency destruction operations caused by the currency control server 200 may require approval by the Federal Reserve or may otherwise occur in response to instructions from the Federal Reserve. Said differently, the present disclosure contemplates that the currency control server 200 may be in compliance with any applicable currency destruction related regulations. In some embodiments, the currency control sever 200 may further be in network communication with or otherwise associated with a distributed ledger. By way of example, a distributed ledger associated with or otherwise controlled by the Federal Reserve may operate to provide an immutable lineage of the state of physical currency notes.

The POS device 102 may also include circuitry, networked processors, or the like configured to perform some or all of the apparatus-based processes described herein, and may include a suitable network server and/or other type of processing device (e.g., a controller 300 or computing device of the POS device 102). In this regard, POS device 102 may be embodied by any of a variety of devices. For example, the POS device 102 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. As described above, the POS device 102 may include accelerometers, gyroscopes, positional sensors, GPS sensors, cameras, image sensors, or the like configured to generate physical currency data associated with physical currency notes. Example embodiments contemplated herein may have various form factors and designs but will nevertheless include at least the components illustrated in FIG. 3A-3B and described in connection therewith.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The currency attribute database 110 may be stored by any suitable storage device configured to store some or all of the information described herein (e.g., memory 204 of the currency control server 200 or a separate memory system separate from the currency control server 200, such as one or more database systems, backend data servers, network databases, cloud storage devices, or the like provided by another device (e.g., online application or $3^{rd}$ party provider) or the POS device 102). The currency attribute database 110 may comprise data received from the currency control server 200 (e.g., via a memory 204 and/or processor(s) 202) and/or the POS device 102 and the corresponding storage device may thus store this data. As noted above, the currency attribute database 110 may, in some embodiments, be formed as part of a distributed ledger.

The user parameter database 112 may be stored by any suitable storage device configured to store some or all of the information described herein (e.g., memory 204 of the currency control server 200 or a separate memory system separate from the currency control server 200, such as one or more database systems, backend data servers, network databases, cloud storage devices, or the like provided by another device (e.g., online application or 3$^{rd}$ party provider) or the POS device 102). The user parameter database 112 may comprise data received from the currency control server 200 (e.g., via a memory 204 and/or processor(s) 202) and/or the POS device 102 and the corresponding storage device may thus store this data.

Example Server Apparatus of the Disclosure

Figure 2:
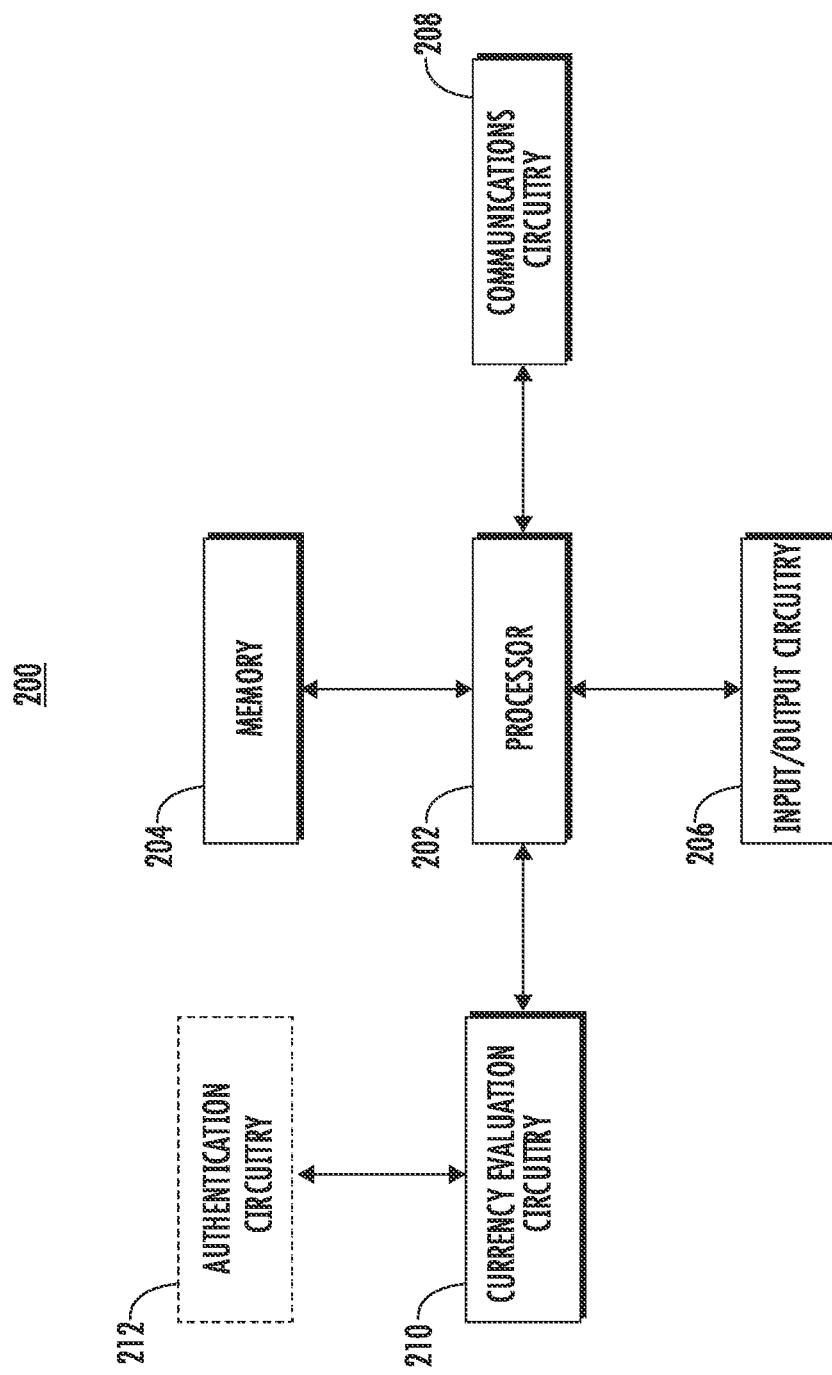
FIG. 2 illustrates a block diagram of an example apparatus embodying a currency control server that may be specially configured in accordance with at least one example embodiment of the present disclosure.

As illustrated in FIG. 2, the currency control server 200 may include a processor 202, a memory 204, communications circuitry 208, and input/output circuitry 206. Moreover, the currency control server 200 may include currency evaluation circuitry 210 and authentication circuitry 212. The currency control server 200 may be configured to execute the operations described below in connection with FIGS. 4-7. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the currency control server 200 may be housed within the POS device 102 described hereafter. It will be understood in this regard that some of the components described in connection with the currency control server 200 may be housed within this device, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the currency control server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the currency control server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the currency control server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the currency control server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The currency control server 200 further includes input/output circuitry 206 that may, in turn, be in communication with processor 202 to provide output to a user and to receive input from a user, POS device 102, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the currency control server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the currency control server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The currency evaluation circuitry 210 includes hardware components designed to generate digital currency data based upon physical currency data. The currency evaluation circuitry 210 may utilize processing circuitry, such as the processor 202, to perform its corresponding operations, and may utilize memory 204 to store collected information. In some instances, the currency evaluation circuitry 210 may determine one or more selected physical currency notes for destruction. In some embodiments, the currency evaluation circuitry 210 may include authentication circuitry 212. The authentication circuitry 212 may include hardware components designed to authenticate physical currency notes based upon currency attribute data. The authentication circuitry 212 may utilize processing circuitry, such as the processor 202, to perform its corresponding operations, and may utilize memory 204 to store collected information.

It should also be appreciated that, in some embodiments, the currency evaluation circuitry 210 or authentication circuitry 212, may include a separate processor, specially configured field programmable gate array (FPGA), or application specific interface circuit (ASIC) to perform its corresponding functions.

In addition, computer program instructions and/or other type of code may be loaded onto a computer, processor or other programmable currency control server's circuitry to produce a machine, such that the computer, processor other programmable circuitry that execute the code on the machine create the means for implementing the various functions, including those described in connection with the components of currency control server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example POS Device of the Disclosure

Figure 3A:
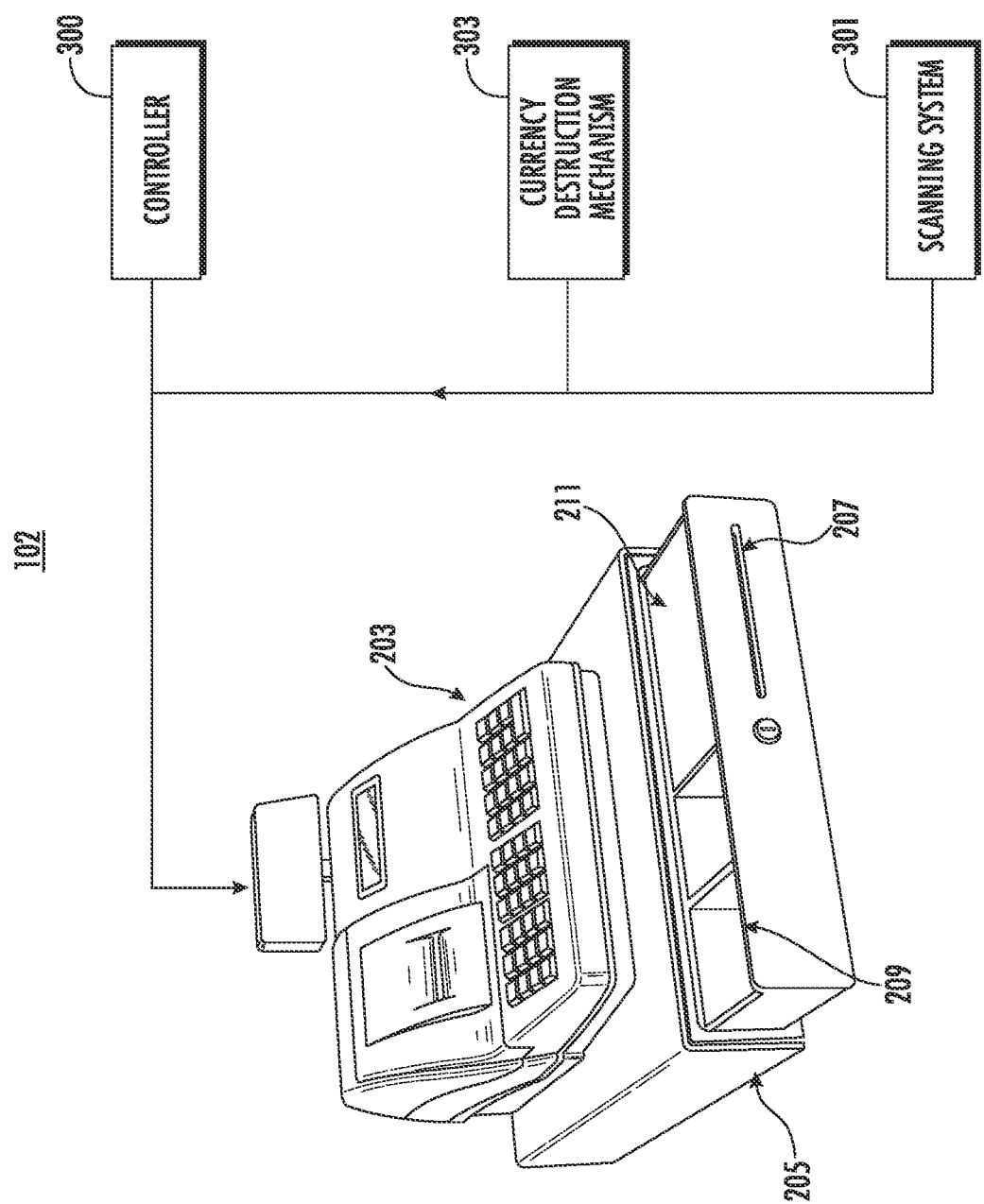
FIG. 3A illustrates an example apparatus embodying a specialized point-of-sale (POS) device that may be specially configured in accordance with at least one example embodiment of the present disclosure.

As described hereafter, in some embodiments, the claimed apparatus may refer to a POS device 102. As such, the POS device 102 may, in whole or in part, embody the functionality of the currency control server 200. As illustrated in FIG. 3A, the POS device 102 may include a scanning system 301, controller 300, and currency destruction mechanism 303. As described above, the POS device 102 may include a scanning system 301 configured to generate physical currency data associated with one or more physical currency notes. The scanning system 301 may include accelerometers, gyroscopes, positional sensors, GPS sensors, cameras, image sensors, or the like configured to generate physical currency data associated with physical currency notes received by the POS device 102. By way of example, the scanning system 301 may include an imager or camera system that, via a slotted input described hereafter, generates physical currency data associated with physical currency notes received by the POS device via the slotted input. In some instances, the scanning system 301 may be supported by or otherwise physically associated with the POS device 102. In other instances, the scanning system 301 may be operably connected with the POS device 102 over a network (e.g., network 104). The scanning system 301 may be communicably coupled with the controller 300. In some instances, the scanning system 301 and controller 300 may be commonly housed within the POS device 102. In other embodiments, the scanning system 301 and controller 300 may be positioned separately and connected over a network (e.g., network 104). In some embodiments, the scanning system 301 may be configured to flag (e.g., mark, denote, etc.) physical currency notes, such as instances in which a physical currency note is suspected to be counterfeit.

As described herein, the POS device 102 may be associated with or otherwise controlled by a central authority, such as the Federal Reserve. In this way, one or more components (e.g., controller 300, scanning system 301, currency destruction mechanism 303, or the like) of the POS device 102 and/or their respective operations may be controlled by such a central authority. By way of example, the currency destruction operations performed by the currency destruction mechanism 303 may require approval by the Federal Reserve or may otherwise occur in response to instructions from the Federal Reserve. Said differently, the present disclosure contemplates that the POS device 102 may be in compliance with any applicable currency destruction related regulations.

The currency destruction mechanism 303 may be coupled with the POS device 102 and comprise any mechanism configured to cause destruction of physical currency notes. By way of example, the currency destruction mechanism 303 may comprise a shredding device configured to mechanically destroy physical materials. Said differently, the currency destruction mechanism 303 may define a shredding device that cuts, tears, granulates, grinds, or otherwise destroys physical currency notes. Although described herein with reference to a shredding device, the present disclosure contemplates that the currency destruction mechanism 303 may comprise any device or system (e.g., burning, chemical destruction, etc.) that may be used to destroy physical currency notes.

As shown in FIG. 3A, the POS device 102 may define a housing 203 configured to support one or more features of the POS device 102 described herein. By way of example, the housing 203 may be configured to enclose or otherwise support the controller 300, scanning system 301, and/or currency destruction mechanism 303. The housing 203 of the POS device 102 may be formed as a cash register or terminal as shown. The present disclosure contemplates that the housing 203 of the POS device 102 may be dimensioned (e.g., sized and shaped) based upon any application of the POS device 102. The housing 203 may, in some embodiments, define a slotted input 207 configured to receive one or more physical currency notes. As described above, the slotted input may be associated with the scanning system 301 such that, as physical currency notes are inserted into the housing 203 via the slotted input 207, the scanning system may generate physical currency data associated with the physical currency notes. Although illustrated and described herein with reference to a slotted input 207, the present disclosure contemplates that any opening or similar feature may be used by the POS device 102 to receive physical currency notes. Furthermore, although described herein with a housing 203 associated with a POS device, the present disclosure contemplates that the housing could similarly be adapted for use with an automated teller machine (ATM) or another similar implementation.

With continued reference to FIG. 3A, the housing 203 may, in some embodiments, define a currency drawer 205 that defines an enclosure for received physical currency notes. As shown, the currency drawer 205 may operate to move from a closed position (not shown) in which the currency drawer is located within the housing 203 and an open position as illustrated in FIG. 3A in which access to at least a portion of the interior of the currency drawer 205 is provided. The currency drawer 205 may define a first portion 209 configured to store physical currency notes that are to be maintained in circulation and a second portion 211 configured to store selected physical currency notes for destruction. In some embodiments, the second portion 211 may be sealed or otherwise secured from access when the currency drawer 205 is in an open position. The second portion 211 of the currency drawer 205 may also be associated with the slotted input 207 such that currency that is scanned by the scanning system 301 may be deposited in the second portion 211 of the currency drawer 205. Although illustrated and described herein with reference to a secured portion (e.g., second portion 211) of a currency drawer 205, the present disclosure contemplates that the POS device 102 may employ any feature for securing the physical currency notes for destruction.

As described hereafter, embodiments of the present disclosure may be configured to cause separation of physical currency notes that are to be maintained in circulation from physical currency notes for destruction. In order to cause this separation, the interior of the currency drawer 205 may define one or more sortation elements (not shown) such as an articulating arm, case sorters, conveyors, picking devices, rollers, bearings, and/or the like configured to move physical currency notes within the currency drawer 205. As illustrated, physical currency notes may be placed in the currency drawer 205 via the slotted input 207. One or more sortation elements therein may, following determination of selected physical currency notes for destruction, move physical currency notes from the second portion 211 to the first portion 205 so that these unselected physical currency notes may be used in circulation. In other embodiments, physical currency notes may be inserted into a currency drawer 205 that defines only a single location (e.g., comingled currency notes). The POS device 102 may, in such an embodiment, includes a scanning system 301 configured to identify physical currency notes for destruction from amongst the comingled currency notes, and move one or more of these selected currency notes to a separate location for further processing and subsequent destruction by the currency destruction mechanism 303. Accordingly, the POS device 102 of the present application may include any number of structural configurations for moving and/or storing physical currency notes as described herein.

With reference to FIG. 3B, the controller 300 may include a processor 302, a memory 304, communications circuitry 308, and input/output circuitry 306. Moreover, the controller 300 of the POS device 102 may include scanning circuitry 310. The controller 300 may also be configured to execute the operations described below in connection with FIGS. 4-7. Although components 302-310 are described in some cases using functional language, it should be understood that the particular implementations necessarily include the use of particular hardware. It should also be understood that certain of these components 302-310 may include similar or common hardware. For example, two sets of circuitry may both leverage use of the same processor 302, memory 304, communications circuitry 308, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the controller 300 or POS device 102 may be housed within the currency control server 200. It will be understood in this regard that some of the components described in connection with the POS device 102 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the POS device 102 may provide or supplement the functionality of particular circuitry.

In some embodiments, the processor 302 (and/or co-processor or any other processing circuitry assisting or otherwise associated with the processor) may be in communication with the memory 304 via a bus for passing information among components of the controller 300 or POS device 102. The memory 304 may be non-transitory and may include, for example, one or more volatile and/or non-volatile memories. In other words, for example, the memory may be an electronic storage device (e.g., a non-transitory computer readable storage medium). The memory 304 may be configured to store information, data, content, applications, instructions, or the like, for enabling the controller 300 or POS device 102 to carry out various functions in accordance with example embodiments of the present invention.

The processor 302 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the POS device 102, and/or remote or "cloud" processors.

In an example embodiment, the processor 302 may be configured to execute instructions stored in the memory 304 or otherwise accessible to the processor 302. Alternatively, or additionally, the processor 302 may be configured to execute hard-coded functionality. As such, whether configured by hardware or by a combination of hardware with software, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

The controller 300 of the POS device 102 further includes input/output circuitry 306 that may, in turn, be in communication with processor 302 to provide output to a user and to receive input from a user, user device, scanning system 301, or another source. In this regard, the input/output circuitry 306 may comprise a display that may be manipulated by a mobile application. In some embodiments, the input/output circuitry 306 may also include additional functionality such as a keyboard, a mouse, a joystick, a touch screen, touch areas, soft keys, a microphone, a speaker, or other input/output mechanisms. The processor 302 and/or user interface circuitry comprising the processor 302 may be configured to control one or more functions of a display through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the POS device 102. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the POS device 102 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The scanning circuitry 310 includes hardware components designed to, in conjunction with the scanning system 301, generate physical currency data associated with one or more physical currency notes. The scanning circuitry 310 may further be configured to control, in whole or in part, or otherwise interface with the scanning system 301. The scanning circuitry 310 may utilize processing circuitry, such as the processor 302, to perform its corresponding operations, and may utilize memory 304 to store collected information. It should also be appreciated that, in some embodiments, the scanning circuitry 310 may include a separate processor, specially configured field programmable gate array (FPGA), or application specific interface circuit (ASIC) to perform its corresponding functions.

In addition, computer program instructions and/or other type of code may be loaded onto a computer, processor or other programmable POS device's circuitry to produce a machine, such that the computer, processor other programmable circuitry that execute the code on the machine create the means for implementing the various functions, including those described in connection with the components of POS device 102.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Currency Control

Figure 4:
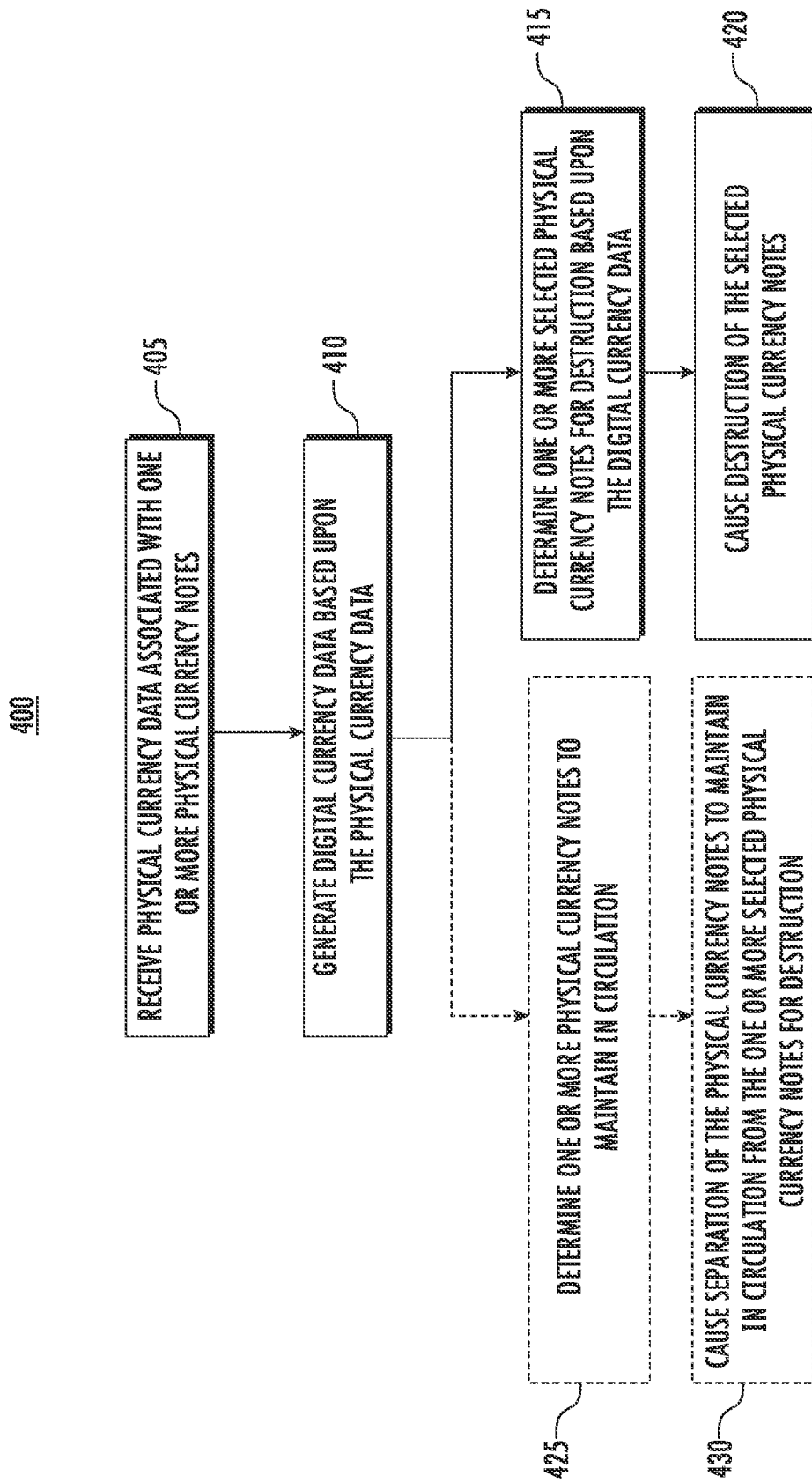
FIG. 4 illustrates an example flowchart for currency control, in accordance with some example embodiments described herein.

FIG. 4 illustrates a flowchart containing a series of operations for providing payment determinations. The operations illustrated in FIG. 4 may, for example, be performed by, with the assistance of, and/or under the control of an apparatus (e.g., currency control server 200), as described above. In this regard, performance of the operations may invoke one or more of processor 202, memory 204, input/output circuitry 206, communications circuitry 208, currency evaluation circuitry 210, and/or authentication circuitry 212. The operations illustrated in FIG. 4 may, for example, be performed by, with the assistance of, and/or under the control of an apparatus (e.g., POS device 300), as described above. In this regard, performance of the operations may invoke one or more of processor 302, memory 304, input/output circuitry 306, communications circuitry 308, and/or scanning circuitry 310.

As shown in operation 405, the apparatus (e.g., currency control server 200) includes means, such as input/output circuitry 206, communications circuitry 208, or the like, for receiving physical currency data associated with one or more physical currency notes. In some example embodiments, an operator of the POS device 102 may receive physical currency notes from a user as part of payment for a transaction or as part of a deposit in the user's account. The scanning system 301 of the POS device 102 may be configured to scan, image, or otherwise generate physical currency data associated with the physical currency notes received by the POS device 102. This physical currency data may include unprocessed image data (e.g., prior to identification of one or more currency attributes) of the physical currency notes. In embodiments in which the POS device 102 completes operation 405, the receipt of physical currency data may instead refer to the generation of physical currency data by the scanning system 301.

The currency control server 200, at operation 405, may receive, in some embodiments, the physical currency data associated with one or more physical currency notes in response to receipt of the physical currency notes by the POS device 102. Said differently, the POS device 102 may automatically or periodically transmit generated physical currency data to the currency control server 200. In other embodiments, the communications circuitry 208 may receive the physical currency data in response to a request by the currency control server 200. By way of example, the currency control server 200 may periodically transmit a request for physical currency data from the POS device 102, and the POS device 102 may transmit generated physical currency data gathered in response to the receipt of physical currency notes at the POS device 102.

Thereafter, as shown in operation 410, the apparatus (e.g., currency control server 200) includes means, such as input/output circuitry 206, currency evaluation circuitry 210, or the like, for generating digital currency data based upon the physical currency data. As described above, the physical currency data received by the currency control server 200 at operation 405 may refer to unprocessed image or scanning data of physical currency notes (e.g., generated by a POS device 102). At operation 410, the currency evaluation circuitry 210 may generate digital currency data that comprises a digital representation of the physical currency notes. By way of example, the currency evaluation circuitry 210 may utilize image processing techniques to determine one or more attributes (e.g., currency attribute data) of the physical currency notes. As defined above, the currency attribute data may refer to the serial number, dimensions, denomination, material, or the like of the physical currency notes. By way of continued example, the currency evaluation circuitry 210 may generate digital currency data that includes the serial number of one or more physical currency notes. Although described hereinafter with reference to serial numbers present on physical currency notes, the present disclosure contemplates that the digital currency data generated at operation 410 may include any currency attribute data based upon the intended application of the currency control server 200. In some embodiments, the digital currency data generated at operation 410 may refer to the issuance of an equivalent value for the physical currency notes in digital form (e.g., central bank issued digital currency (CBDC), cryptographic tokens, digital credit issued by a central authority, and/or the like).

In instances in which the POS device 102 is the example apparatus, the controller 300 of the POS device 102 includes means, such as input/output circuitry 306, processor 302, or the like, for generating digital currency data based upon the physical currency data. Similar to the currency control server 200, the physical currency data generated by the POS device 102 at operation 405 may refer to unprocessed image or scanning data of physical currency notes. At operation 410, the controller 300 may generate digital currency data that comprises a digital representation of the physical currency notes. The controller 300 may similarly utilize image processing technique to determine one or more attributes (e.g., currency attribute data) of the physical currency notes. By way of continued example, the controller 300 may generate digital currency data that includes the serial number of one or more physical currency notes.

Thereafter, as shown in operation 415, the apparatus (e.g., currency control server 200) includes means, such as processor 202, currency evaluation circuitry 210, or the like, for determining one or more selected physical currency notes for destruction based upon the digital currency data. As described further with reference to FIG. 6, the currency control server 200 may utilize a currency attribute database 110 that may, in some embodiments, store currency attribute data for physical currency notes to determine one or more selected physical currency notes for destruction. The currency attribute database 110 may, in some embodiments, be managed or otherwise updated by a regulatory agency or central authority (e.g., the Federal Reserve or the like) and list particular currency attributes by which physical currency notes may be selected for destruction. By way of example, a central authority may determine that, in order to address inflation issues or reduce the impact of counterfeiting attempts, physical currency notes of a particular denomination (e.g., $100 USD bills or above) or having particular serial numbers (e.g., older in time physical currency notes) should be removed from circulation and destroyed. The currency attribute database 110 may include currency attribute data relating to these particular attributes and may be accessed by the currency control server 200 and/or POS device 102. As described above, the currency attribute database 110 may, in some embodiments, be formed in whole or in part as a distributed ledger.

As such, the determination at operation 415 may refer to the currency control server's 200 access of the currency attribute database 110 to identify particular currency attributes associated with requested destruction by the central authority and subsequent comparison, via the currency evaluation circuitry 210, of the digital currency data to identify one or more of the retrieved particular currency attributes. For example, the currency attribute database 110 may, in some embodiments store currency attribute data that comprises serial numbers of physical currency notes designated by a central authority for destruction. The currency evaluation circuitry 210 may identify currency attribute data of the digital currency data that also includes serial number data and compare these serial numbers in order to determine physical currency notes for destruction. Said differently, the currency evaluation circuitry 210 may determine that physical currency notes having digital currency data that includes a serial number listed in the currency attribute database 110 are selected for destruction. Alternatively, the currency evaluation circuitry 210 may determine that physical currency notes having digital currency data that includes a serial number listed in the currency attribute database 110 are to be maintained in circulation.

In instances in which the POS device 102 is the example apparatus, the controller 300 of the POS device 102 includes means, such as input/output circuitry 306, processor 302, or the like, for determining one or more selected physical currency notes for destruction based upon the digital currency data. Similar to the currency control server 200, the digital currency data generated by the POS device 102 at operation 410 may also include currency attributes listed in the currency attribute database 110 as designated for destruction. As such, the controller 300 may determine that physical currency notes having digital currency data listed in the currency attribute database 110, for example matching serial numbers, are selected for destruction at operation 415.

Figure 7:
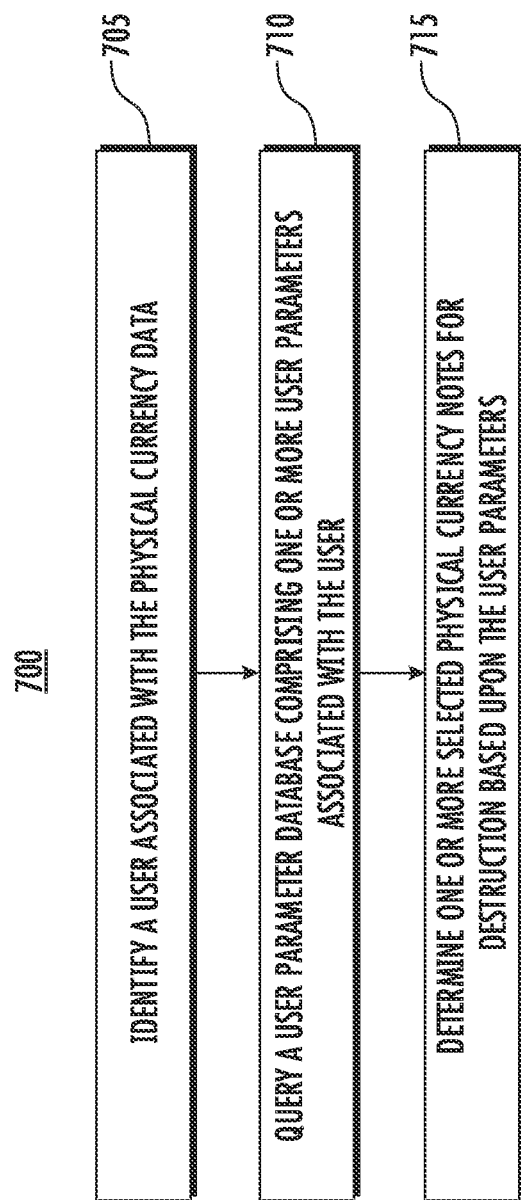
FIG. 7 illustrates an example flowchart for user parameter determinations, in accordance with some example embodiments described herein.

As described further with reference to FIG. 7, the currency control server 200 may utilize a user parameter database 112 that may, in some embodiments, store user parameter data as defined above to determine one or more selected physical currency notes for destruction. The user parameter database 112 may, in some embodiments, include one or more financial parameters, transaction histories, balances, spending patterns, social media data entries, travel histories, location data entries, preferences, or the like of a user. As such, the user parameter data of the user parameter database 112 may be used to determine or otherwise infer relevant locations of the physical currency notes. By way of example, user parameter data associated with a user my indicate, via geolocation data, network connections, social media posts, financial transactions, etc., that the user has recently been located in an area with high incidences of an infectious disease. A central authority (e.g., the Center for Disease Control or the like) may determine that, in order to prevent or reduce the spread of such infectious diseases, physical currency notes from a particular location should be destroyed.

As such, the determination at operation 415 may refer to the currency control server's 200 access of the user parameter database 112 to determine if a user has previously been located in a location designated by the central authority as a high risk area such that physical currency notes from such locations should be destroyed. For example, the currency control server may identify a user associated with the physical currency data, via, for example, user inputted account credentials. The currency control server 200 may subsequently query the user parameter database 112 to determine if the user has been recently located in a high risk area, and, if so, determine that the physical currency notes provided by this user are selected for destruction. In instances in which the POS device 102 is the example apparatus, the controller 300 of the POS device 102 includes means, such as input/output circuitry 306, processor 302, communications circuitry 308, or the like, for determining one or more selected physical currency notes for destruction based upon the digital currency data. Similar to the currency control server 200, the POS device 102 at operation 415 may also query the user parameter database 112 to retrieve user parameter data of an identified user and, determine if the user has been recently located in a high risk area such that the physical currency notes provided by this user are selected for destruction.

Thereafter, as shown in operation 420, the apparatus (e.g., currency control server 200) includes means, such as the processor 202, communications circuitry 208, or the like, for causing destruction of the selected physical currency notes. As described above, the currency control circuitry 200 may be coupled with the POS device 102 that defines a currency destruction mechanism 303. In response to the determination of one or more selected physical currency notes for destruction at operation 415, the currency control server 200 may transmit an instruction to the POS device 102 to destroy, via the currency destruction mechanism 303, the selected physical currency notes. In some embodiments, the currency control server 200 may cause the destruction of the selected physical currency notes immediately (e.g., in real-time) upon the determination at operation 415. In other embodiments, the currency control server 200 may periodically transmit an instruction to the POS device 102 to destroy a plurality of selected physical currency notes. Said differently, the currency control server 200 may operate to batch the determinations at operation 415 to reduce the required number of communications to the POS device 102. Although described herein with reference to the POS device 102, the present disclosure contemplates that the currency control server 200 may rely upon any mechanism for currency destruction in combination with or separate from the POS device 102.

In instances in which the POS device 102 is the example apparatus, the controller 300 of the POS device 102 includes means, such as input/output circuitry 306, processor 302, currency destruction mechanism 303, or the like, for causing destruction of the selected physical currency notes. Similar to the currency control server 200, the currency destruction mechanism 303 may cause the destruction of the selected physical currency notes immediately (e.g., in real-time) upon the determination at operation 415. In other embodiments, the currency destruction mechanism 303 may periodically destroy a plurality of selected physical currency notes. Said differently, the currency destruction mechanism 303 and controller 300 may operate to batch the determinations at operation 415 to reduce the required number of operations performed by the currency destruction mechanism 303.

As described above, the currency control server 200 and/or the POS device 102 may, in some embodiments, be controlled by a central authority, such as the Federal reserve. As such, causing destruction of the selected physical currency notes at operation 420 may refer to instructions provided by the central authority approving the destruction of the selected physical currency notes. In some instances, the currency control server 200 and/or the POS device 102 may transmit a request to the central authority requesting approval for the destruction of the selected physical currency notes so as to comply with any currency destruction related regulations. Furthermore, causing the destruction of the selected physical currency notes at operation 420 may, in some embodiments, refer to a staging location at which the physical currency notes may be stored and subsequently destroyed, such as instances in which the server 200 or POS device 102 lack communication with a central authority. By way of example, operation 420 may refer to storage of the selected physical currency notes by the POS 102 (e.g., in a holding mechanism or the like) until approval is received by a central authority to shred or otherwise destroy the selected physical currency notes.

In some embodiments, as shown in operation 425, the apparatus (e.g., currency control server 200) includes means, such as the processor 202, the communications circuitry 208, or the like, for determining one or more physical currency notes to maintain in circulation. As described above, the currency control server 200 may, in some embodiments, compare the digital currency data generated at operation 410 with one or more of the currency attribute database 110 or the user parameter database 112. In doing so, the currency evaluation circuitry 210 may determine one or more selected physical currency notes for destruction at operation 415 by comparing the currency attributes of the digital currency data with the currency attribute database 110 or the user parameters with designated high risk areas (e.g., as set by a central authority). In contrast, the physical currency notes that are not selected for destruction at operation 415 may instead be determined as physical currency notes to maintain in circulation.

In instances in which the POS device 102 is the example apparatus, the controller 300 of the POS device 102 includes means, such as input/output circuitry 306, processor 302, or the like, for similarly determining one or more physical currency notes to maintain in circulation. As described above, the POS device 102 may also compare the digital currency data generated at operation 410 with one or more of the currency attribute database 110 or the user parameter database 112. In doing so, the controller 300 may determine one or more selected physical currency notes for destruction at operation 415 by comparing the currency attributes of the digital currency data with the currency attribute database 110 or the user parameters with designated high risk areas (e.g., as set by a central authority). In contrast, the physical currency notes that are not selected for destruction at operation 415 may instead be determined as physical currency notes to maintain in circulation.

In some embodiments, as shown in operation 430, the apparatus (e.g., currency control server 200) includes means, such as the processor 202, the authentication circuitry 214, or the like, for causing separation of the physical currency notes to maintain in circulation from the one or more selected physical currency notes for destruction. As described above, the interior of the currency drawer 205 of the POS device 102 coupled with the currency control server 200 may define one or more sortation elements (e.g., an articulating arm, case sorters, conveyors, picking devices, rollers, bearings, and/or the like) configured to move physical currency notes within the currency drawer 205. As such, the currency control server 200 may transmit an instruction to the POS device 102 in order to cause separation of the physical currency notes to maintain in circulation from the one or more selected physical currency notes for destruction. Although described herein with reference to the POS device 102, the present disclosure contemplates that the currency control server 200 may rely upon any mechanism for causing separation of the physical currency notes to maintain in circulation in combination with or separate from the POS device 102.

In instances in which the POS device 102 is the example apparatus, the controller 300 of the POS device 102 includes means, such as input/output circuitry 306, processor 302, or the like, for similarly causing separation of the physical currency notes to maintain in circulation from the one or more selected physical currency notes for destruction. As described above, the interior of the currency drawer 205 of the POS device 102 may define one or more sortation elements (e.g., an articulating arm, case sorters, conveyors, picking devices, rollers, bearings, and/or the like) configured to move physical currency notes within the currency drawer 205. As such, the POS device 102 may actuate one or more of these sortation elements in order to cause separation of the physical currency notes to maintain in circulation from the one or more selected physical currency notes for destruction.

Figure 5:
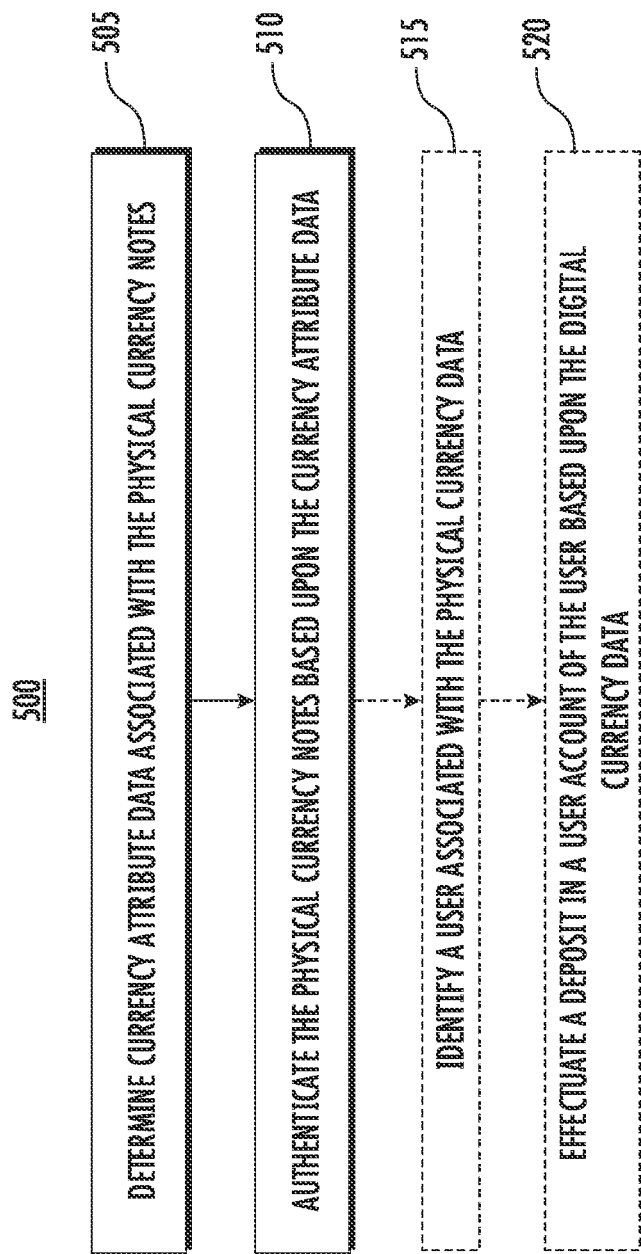
FIG. 5 illustrates an example flowchart for currency authentication, in accordance with some example embodiments described herein.

Turning next to FIG. 5, a flowchart is shown for currency authentication. The operations illustrated in FIG. 5 may, for example, be performed by, with the assistance of, and/or under the control of an apparatus (e.g., currency control server 200), as described above. In this regard, performance of the operations may invoke one or more of processor 202, memory 204, input/output circuitry 206, communications circuitry 208, currency evaluation circuitry 210, and/or authentication circuitry 212. The operations illustrated in FIG. 5 may, for example, be performed by, with the assistance of, and/or under the control of an apparatus (e.g., POS device 300), as described above. In this regard, performance of the operations may invoke one or more of processor 302, memory 304, input/output circuitry 306, communications circuitry 308, and/or scanning circuitry 310.

As shown in operation 505, the apparatus (e.g., currency control server 200) includes means, such as input/output circuitry 206, currency evaluation circuitry 210, authentication circuitry 212, or the like, for determining currency attribute data associated with the physical currency notes. As described above, the currency evaluation circuitry 210 may utilize image processing techniques to determine one or more attributes (e.g., currency attribute data) of the physical currency notes. This currency attribute data may refer to the serial number, dimensions, denomination, material, or the like of the physical currency notes. By way of example, the currency evaluation circuitry 210 may generate digital currency data that includes the serial number, the watermark, the material, and/or the like of one or more physical currency notes. The present disclosure contemplates that the digital currency data described herein may include any currency attribute data based upon the intended application of the currency control server 200.

In instances in which the POS device 102 is the example apparatus, the controller 300 of the POS device 102 includes means, such as input/output circuitry 306, processor 302, or the like, for similarly determining currency attribute data associated with the physical currency notes. The scanning system 301 and/or controller 300 may utilize image processing techniques to determine one or more attributes (e.g., currency attribute data) of the physical currency notes received by the POS device 102. This currency attribute data may also refer to the serial number, dimensions, denomination, material, or the like of the physical currency notes. The present disclosure contemplates that the digital currency data described herein may include any currency attribute data based upon the intended application of the POS device 102.

As shown in operation 510, the apparatus (e.g., currency control server 200) includes means, such as input/output circuitry 206, authentication circuitry 212, or the like, for authenticating the physical currency notes based upon the currency attribute data. As described and defined above, the currency control server 200 may utilize a currency attribute database 110 that may, in some embodiments, store currency attribute data for physical currency notes. The currency attribute database 110 may, in some embodiments, be managed or otherwise updated by a regulatory agency or central authority (e.g., the Federal Reserve or the like) and list particular currency attributes by which physical currency notes may compared for authentication. By way of example, a central authority may maintain the currency attribute database 110 as a collection of verified or otherwise valid currency attributes and/or known invalid currency attributes. Said differently, the currency attribute database 110 may be dynamically modified or updated with currency attribute data indicative of the validity of physical currency notes having said currency attribute data. Such validity may, in some embodiments, refer to an indication of potential counterfeit physical currency notes. For example, the currency attribute database 110 may include currency attribute data that lists known counterfeit physical currency notes (e.g., notes previously truncated or destroyed by the POS device 102).

As such, the authentication at operation 510 may refer to the currency control server's 200 access of the currency attribute database 110 to identify particular currency attributes associated with either valid or invalid physical currency notes. The authentication circuitry 212 may compare the currency attribute data determined at operation 505 with the currency attribute data of the currency attribute database 110 to determine if a physical currency note is invalid (e.g., counterfeit or otherwise inapplicable for use) or valid (e.g., authentic). In instances in which the currency attribute data determined at operation 505 is, based upon comparison with the currency attribute database 110, authentic, the authentication circuitry 212 may authenticate the physical currency notes at operation 510.

In instances in which the POS device 102 is the example apparatus, the controller 300 of the POS device 102 includes means, such as input/output circuitry 306, processor 302, or the like, for similarly authenticating the physical currency notes based upon the currency attribute data. As described and defined above, the POS device 102 may utilize a currency attribute database 110 that may, in some embodiments, store currency attribute data for physical currency notes. The currency attribute database 110 may, in some embodiments, be managed or otherwise updated by a regulatory agency or central authority (e.g., the Federal Reserve or the like) and list particular currency attributes by which physical currency notes may compared for authentication. As described above, a central authority may maintain the currency attribute database 110 as a collection of verified or otherwise valid currency attributes and/or known invalid currency attributes with associated statuses (e.g., destroyed, in circulation, distributed, etc.).

As such, the authentication at operation 510 may refer to the controller 300 of the POS device 102's access of the currency attribute database 110 to identify particular currency attributes associated with either valid or invalid physical currency notes. The controller 300 compare the currency attribute data determined at operation 505 with the currency attribute data of the currency attribute database 110 to determine if a physical currency note is invalid (e.g., counterfeit or otherwise inapplicable for use) or valid (e.g., authentic). In instances in which the currency attribute data determined at operation 505 is, based upon comparison with the currency attribute database 110, authentic, the controller 300 may authenticate the physical currency notes at operation 510.

In some embodiments, as shown in operation 515, the apparatus (e.g., currency control server 200) includes means, such as input/output circuitry 206, currency evaluation circuitry 210, or the like, for identifying a user associated with the physical currency data. Similarly, in instances in which the POS device 102 is the apparatus, the POS device 102 includes means, such as input/output circuitry 306, processor 302, or the like, for identifying a user associated with the physical currency data. As described above, the embodiments of the present disclosure may operate to provide a location for transacting with a financial institution which were historically unavailable (e.g., the unbanked and underbanked). As such, the interaction of user with the currency control server 200 and/or the POS device 102 may relate to a requested deposit (as part of a transaction with a merchant or otherwise) by the user. In such an embodiment, the identification by the currency control server 200 at operation 515 may, for example, occur in response to the user providing account credentials to the POS device 102 or currency control server 200. The currency control server 200 and/or the POS device 102 may use these account credentials to identify the user at operation 515. Although described herein with reference to account credentials, the present disclosure contemplates that any user parameter information or other provided/retrieved user data may be used to identify the user associated with the physical currency data at operation 515.

In some embodiments, as shown in operation 520, the apparatus (e.g., currency control server 200) includes means, such as the processor 202, the authentication circuitry 214, or the like, for effectuating a deposit in a user account of the user based upon the digital currency data. In some embodiments, the currency control server 200 may be communicably coupled with a user account associated with the identified user such as instances in which the currency control server 200 is associated with a financial institution or banking entity. In such an embodiment, the amount associated with the physical currency notes, as defined by the digital currency data, may be effectuated in that the communications circuitry 208 of the currency control server 200 may cause funds to be deposited into the user's account (e.g., digital wallet, exchange account, credit card account, debit card account, distributed ledger, etc.).

In instances in which the POS device 102 is the example apparatus, the controller 300 of the POS device 102 includes means, such as input/output circuitry 306, processor 302, or the like, for similarly effectuating a deposit in a user account of the user based upon the digital currency data. As described above, the POS device 102 may be communicably coupled with a user account associated with the identified user such as instances in which the POS device 102 is associated with a financial institution or banking entity. In such an embodiment, the amount associated with the physical currency notes, as defined by the digital currency data, may be effectuated in that the communications circuitry 308 of the POS device 102 may cause funds to be deposited into the user's account.

Figure 6:
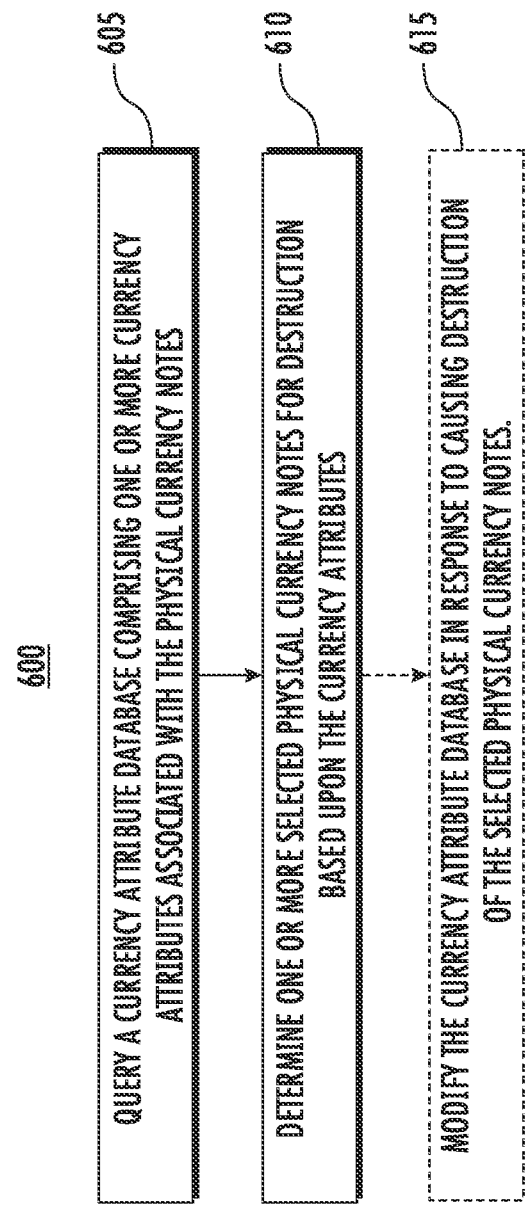
FIG. 6 illustrates an example flowchart for currency attribute determinations, in accordance with some example embodiments described herein.

Turning next to FIG. 6, a flowchart is shown for currency attribute determinations. The operations illustrated in FIG. 6 may, for example, be performed by, with the assistance of, and/or under the control of an apparatus (e.g., currency control server 200), as described above. In this regard, performance of the operations may invoke one or more of processor 202, memory 204, input/output circuitry 206, communications circuitry 208, currency evaluation circuitry 210, and/or authentication circuitry 212. The operations illustrated in FIG. 6 may, for example, be performed by, with the assistance of, and/or under the control of an apparatus (e.g., POS device 300), as described above. In this regard, performance of the operations may invoke one or more of processor 302, memory 304, input/output circuitry 306, communications circuitry 308, and/or scanning circuitry 310.

As shown in operation 605, the apparatus (e.g., currency control server 200) includes means, such as input/output circuitry 206, communications circuitry 208, or the like, for querying a currency attribute database 110 comprising one or more currency attributes associated with the physical currency notes. As described above, the currency control server 200 may utilize a currency attribute database 110 that may, in some embodiments, store currency attribute data for physical currency notes to determine one or more selected physical currency notes for destruction. The currency attribute database 110 may, in some embodiments, be managed or otherwise updated by a regulatory agency or central authority (e.g., the Federal Reserve or the like) and list particular currency attributes by which physical currency notes may be selected for destruction. A central authority may, for example, determine that, in order to address inflation issues or reduce the impact of counterfeiting attempts, physical currency notes of a particular denomination (e.g., $100 USD bills or above) or having particular serial numbers (e.g., older in time physical currency notes) should be removed from circulation and destroyed. The currency attribute database 110 may include currency attribute data relating to these particular attributes and may be accessed by the currency control server 200 and/or POS device 102. Said differently, in instances in with the POS device 102 is the example apparatus, the POS device 102 includes means, such as input/output circuitry 306, communications circuitry 308, or the like, for querying a currency attribute database comprising one or more currency attributes associated with the physical currency notes.

As shown in operation 610, the apparatus (e.g., currency control server 200) includes means, such as input/output circuitry 206, currency evaluation circuitry 210, or the like, for determining one or more selected physical currency notes for destruction based upon the currency attributes. Similarly, in instances in with the POS device 102 is the example apparatus, the POS device 102 includes means, such as input/output circuitry 306, processor 302, or the like, for determining one or more selected physical currency notes for destruction based upon the currency attributes. By way of example, the determination at operation 610 may refer to the currency control server's 200 access of the currency attribute database 110 to identify particular currency attributes associated with requested destruction by the central authority and subsequent comparison, via the currency evaluation circuitry 210, of the digital currency data to identify one or more of the retrieved particular currency attributes.

For example, the currency attribute database 110 may, in some embodiments store currency attribute data that comprises serial numbers of physical currency notes designated by a central authority for destruction. The currency evaluation circuitry 210 may identify currency attribute data of the digital currency data that also includes serial number data and compare these serial numbers in order to determine physical currency notes for destruction. Said differently, the currency evaluation circuitry 210 may determine that physical currency notes having digital currency data that includes a serial number listed in the currency attribute database 110 are selected for destruction. Although described herein with reference to currency attribute data that includes serial numbers associated with physical currency notes, the present disclosure contemplates that the currency attribute database 110 may store currency attribute data of any type used to determine selected currency notes for destruction.

In some example embodiments, as shown in operation 615, the apparatus (e.g., currency control server 200)

includes means, such as the processor 202, the currency evaluation circuitry 210, or the like, for modifying the currency attribute database in response to causing destruction of the selected physical currency notes. Similarly, in instances in with the POS device 102 is the example apparatus, the POS device 102 includes means, such as communications circuitry 308, processor 302, or the like, for modifying the currency attribute database in response to causing destruction of the selected physical currency notes. As described above with reference to operation 420, the currency control server 200 and/or the POS device 102 may operate to cause destruction of selected physical currency notes. In some embodiments, the currency control server 200 and/or the POS device 102 may, following destruction of the selected physical currency notes, modify the currency attribute database 110 to reflect this destruction.

Said differently, the currency control server 200 and/or the POS device 102 may operate to dynamically update or modify the currency attribute database 110 in real-time by removing or otherwise augmenting currency attribute data stored by the currency attribute database 100. For example, the currency control server 200 and/or the POS device 102 may transmit instructions to a central authority that manages the currency attribute database 110 indicative of the destruction of selected physical currency notes. The currency attribute database 110 may, in some embodiments, mark or designate the currency attribute data associated with these selected notes as destroyed. In other embodiments, the currency attribute database 110 may, remove the currency attribute data associated with these destroyed physical currency notes. In doing so, the currency attribute database 110 may be consistently updated in real-time to provide improved currency authentication as described above with reference to FIG. 5.

Turning next to FIG. 7, a flowchart is shown for user parameter determinations. The operations illustrated in FIG. 7 may, for example, be performed by, with the assistance of, and/or under the control of an apparatus (e.g., currency control server 200), as described above. In this regard, performance of the operations may invoke one or more of processor 202, memory 204, input/output circuitry 206, communications circuitry 208, currency evaluation circuitry 210, and/or authentication circuitry 212. The operations illustrated in FIG. 7 may, for example, be performed by, with the assistance of, and/or under the control of an apparatus (e.g., POS device 300), as described above. In this regard, performance of the operations may invoke one or more of processor 302, memory 304, input/output circuitry 306, communications circuitry 308, and/or scanning circuitry 310.

As shown in operation 705, the apparatus (e.g., currency control server 200) includes means, such as input/output circuitry 206, communications circuitry 208, or the like, for identifying a user associated with the physical currency data. Similarly, in instances in with the POS device 102 is the example apparatus, the POS device 102 includes means, such as communications circuitry 308, input/output circuitry 306, or the like, for identifying a user associated with the physical currency data. As described above, the embodiments of the present disclosure may operate to provide a location for transacting with a financial institution which were historically unavailable (e.g., the unbanked and underbanked). As such, the interaction of user with the currency control server 200 and/or the POS device 102 may relate to a requested deposit (as part of a transaction with a merchant or otherwise) by the user. In such an embodiment, the identification by the currency control server 200 at operation 705 may, for example, occur in response to the user providing account credentials to the POS device 102 or currency control server 200. The currency control server 200 and/or the POS device 102 may use these account credentials to identify the user at operation 705. Although described herein with reference to account credentials, the present disclosure contemplates that any user parameter information or other provided/retrieved user data may be used to identify the user associated with the physical currency data at operation 705.

As shown in operation 710, the apparatus (e.g., currency control server 200) includes means, such as input/output circuitry 206, currency evaluation circuitry 210, communications circuitry 208, or the like, for querying a user parameter database comprising one or more user parameters associated with the user. Similarly, in instances in with the POS device 102 is the example apparatus, the POS device 102 includes means, such as input/output circuitry 306, processor 302, communications circuitry 308, or the like, for querying a user parameter database comprising one or more user parameters associated with the user. As described above, the currency control server 200 may utilize a user parameter database 112 that may, in some embodiments, store user parameter data as defined above to determine one or more selected physical currency notes for destruction. The user parameter database 112 may, in some embodiments, include one or more financial parameters, transaction histories, balances, spending patterns, social media data entries, travel histories, location data entries, preferences, or the like of a user. As such, the user parameter data of the user parameter database 112 may be used to determine or otherwise infer relevant locations of the physical currency notes. By way of example, user parameter data associated with a user my indicate, via geolocation data, network connections, social media posts, financial transactions, etc., that the user has recently been located in an area with high incidences of an infectious disease. A central authority (e.g., the Center for Disease Control or the like) may determine that, in order to prevent or reduce the spread of such infectious diseases, physical currency notes from a particular location should be destroyed. The user parameter database 112 may include user parameter data relating to these high risk locations and may be accessed by the currency control server 200 and/or POS device 102.

As shown in operation 715, the apparatus (e.g., currency control server 200) includes means, such as input/output circuitry 206, currency evaluation circuitry 210, or the like, for determining one or more selected physical currency notes for destruction based upon the user parameters. Similarly, in instances in with the POS device 102 is the example apparatus, the POS device 102 includes means, such as input/output circuitry 306, processor 302, or the like, for determining one or more selected physical currency notes for destruction based upon the user parameters. For example, the determination at operation 715 may refer to the currency control server's 200 access of the user parameter database 112 to determine if a user has previously been located in a location designated by the central authority as a high risk area such that physical currency notes from such locations should be destroyed. For example, the currency control server may identify a user associated with the physical currency data, via, for example, user inputted account credentials. The currency control server 200 may subsequently query the user parameter database 112 to determine if the user has been recently located in a high risk area, and, if so, determine that the physical currency notes provided by this user are selected for destruction. Similar to the currency control server 200, the POS device 102 at operation 715 may also query the user parameter database 112 to retrieve user parameter data of an identified user and, determine if the user has been recently located in a high risk area such that the physical currency notes provided by this user are selected for destruction. Although described herein with reference to user location data from the user parameter database, the present disclosure contemplates that any parameter (e.g., transaction data, social media data, etc.) may be used in operation 715.

As described above, various technical challenges are surmounted via technical solutions contemplated herein. For instance, example implementations of embodiments of the present disclosure may, via a currency control server and/or POS device, generate digital currency data based upon physical currency notes received by a POS device and determine selected physical currency notes for destruction based upon the digital currency data. These systems and devices may query currency attribute databases to retrieve data indicative of the attributes of the physical currency notes and may further query user parameter databases that store various parameters associated with a user supplying the physical currency notes. In doing so, the system may, in real-time and at a point-of sale/transaction, ascertain physical currency for destruction. In this way, the inventors have identified that the advent of new scanning technologies have created a new opportunity for solutions for providing currency digitization and control which were historically unavailable. In doing so, such example implementations confront and solve at least two technical challenges: (1) they generate digital payment data in real-time at a point of sale or transaction, and (2) they provide currency destruction functionality in a decentralized system.

FIGS. 4-7 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the currency control server 200 and executed by a processor 202 of the currency control server 200. Additionally, the computer program instructions may be stored by a memory 304 of the controller 300 and executed by a processor 302 of the controller 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A point-of-sale (POS) device for use with physical currency notes, the POS device comprising:
   a housing that defines a slotted input configured to receive one or more physical currency notes;
   a scanning system supported within the housing, wherein the scanning system is configured to generate physical currency data associated with the one or more physical currency notes; and
   a controller supported within the housing and operably coupled with the scanning system, wherein the controller is configured to:
      generate digital currency data based upon the physical currency data, wherein the digital currency data comprises a digital representation of the physical currency notes;
      query a currency attribute database using the digital currency data to retrieve one or more currency attributes associated with the physical currency notes;
      identify a user associated with the physical currency data;
      query a user parameter database to retrieve one or more user parameters associated with the identified user;
      determine one or more selected physical currency notes for destruction based upon one or more of the currency attributes retrieved from the currency attribute database or the user parameters retrieved from the user parameter database; and
      request approval for subsequent destruction of the selected physical currency notes from a central authority associated with the currency attribute database.

2. The POS device according to claim 1, wherein the controller is further configured to authenticate the physical currency notes based upon the currency attributes.

3. The POS device according to claim 2, wherein the controller is further configured to, in response to authenticating the physical currency notes:
   identify the user associated with the physical currency data; and
   effectuate a deposit in a user account of the user based upon the digital currency data.

4. The POS device according to claim 1, wherein the controller is further configured to:
   determine one or more physical currency notes to maintain in circulation; and
   cause separation of the physical currency notes to maintain in circulation from the one or more selected physical currency notes for destruction.

5. The POS device according to claim 1, wherein the slotted input is associated with the scanning system such that the physical currency notes received by the slotted input are scanned upon input.

6. The POS device according to claim 1, wherein the housing comprises a currency drawer defining an enclosure for receiving physical currency and the currency drawer defines:
   a first portion for storing one or more physical currency notes to maintain in circulation; and
   a second portion for storing the one or more selected physical currency notes for destruction.

7. The POS device according to claim 6, wherein the slotted input is associated with the second portion of the currency drawer.

8. A method for currency control comprising:
   receiving, via a slotted input defined by a housing of a point-of-sale (POS) device, one or more physical currency notes;
   generating, via a scanning system supported within the housing of the POS device, physical currency data associated with the one or more physical currency notes;
   generating, via a controller supported within the housing of the POS device, digital currency data based upon the physical currency data, wherein the digital currency data comprises a digital representation of the physical currency notes;
   querying, via the controller, a currency attribute database using the digital currency data to retrieve one or more currency attributes associated with the physical currency notes;
   identifying, via the controller, a user associated with the physical currency data;
   querying, via the controller, a user parameter database to retrieve one or more user parameters associated with the identified user;
   determining, via the controller, one or more selected physical currency notes for destruction based upon one or more of the currency attributes retrieved from the currency attribute database or the user parameters retrieved from the user parameter database; and
   requesting, via the controller, approval for subsequent destruction of the selected physical currency notes from a central authority associated with the currency attribute database.

9. The method according to claim 8, further comprising authenticating, via the controller, the physical currency notes based upon the currency attributes.

10. The method according to claim 9, wherein, in response to authenticating the physical currency notes, further comprises:
    identifying, via the controller, the user associated with the physical currency data; and
    effectuating, via the controller, a deposit in a user account of the user based upon the digital currency data.

11. A computer program product for currency control comprising at least one nontransitory computer-readable storage medium having computer program code thereon that, in execution with at least one processor, configures the computer program product for:
    receiving, via a slotted input defined by a housing of a point-of-sale (POS) device, one or more physical currency notes;
    generating, via a scanning system supported within the housing of the POS device, physical currency data associated with the one or more physical currency notes;
    generating, via a controller supported within the housing of the POS device, digital currency data based upon the physical currency data, wherein the digital currency data comprises a digital representation of the physical currency notes;
    querying, via the controller, a currency attribute database using the digital currency data to retrieve one or more currency attributes associated with the physical currency notes;
    identifying, via the controller, a user associated with the physical currency data;
    querying, via the controller, a user parameter database to retrieve one or more user parameters associated with the identified user;
    determining, via the controller, one or more selected physical currency notes for destruction based upon the digital currency data one or more of the currency attributes retrieved from the currency attribute database or the user parameters retrieved from the user parameter database; and
    requesting, via the controller, approval for subsequent destruction of the selected physical currency notes from a central authority associated with the currency attribute database.

12. The computer program product according to claim 11, further comprising computer program code that, in execution with at the least one processor, configures the computer program product for authenticating the physical currency notes based upon the currency attributes.

* * * * *

UNITED STATES PATENT AND TRADEMARK OFFICE
CERTIFICATE OF CORRECTION

PATENT NO. : 11,681,995 B1
APPLICATION NO. : 17/091613
DATED : June 20, 2023
INVENTOR(S) : Ramanathan Ramanathan et al.

Page 1 of 1

It is certified that error appears in the above-identified patent and that said Letters Patent is hereby corrected as shown below:

In the Claims

Column 30, Lines 44-46 Claim 11: Replace "based upon the digital currency data one or more of the currency attributes" with --based upon one or more of the currency attributes--

Signed and Sealed this
Seventeenth Day of December, 2024

Derrick Brent
*Acting Director of the United States Patent and Trademark Office*